(12) United States Patent
Falk et al.

(10) Patent No.: US 10,084,821 B2
(45) Date of Patent: Sep. 25, 2018

(54) ADAPTATION OF ACCESS RULES FOR A DATA INTERCHANGE BETWEEN A FIRST NETWORK AND A SECOND NETWORK

(71) Applicant: SIEMENS AKTIENGESELLSCHAFT, München (DE)

(72) Inventors: Rainer Falk, Poing (DE); Kai Fischer, Baldham (DE); Steffen Fries, Baldham (DE)

(73) Assignee: Siemens Aktiengesellschaft, München (DE)

( * ) Notice: Subject to any disclaimer, the term of this patent is extended or adjusted under 35 U.S.C. 154(b) by 239 days.

(21) Appl. No.: 15/024,615

(22) PCT Filed: Aug. 5, 2014

(86) PCT No.: PCT/EP2014/066814
§ 371 (c)(1),
(2) Date: Mar. 24, 2016

(87) PCT Pub. No.: WO2015/043807
PCT Pub. Date: Apr. 2, 2015

(65) Prior Publication Data
US 2016/0241597 A1  Aug. 18, 2016

(30) Foreign Application Priority Data

Sep. 26, 2013 (DE) .................. 10 2013 219 375

(51) Int. Cl.
*H04L 9/32* (2006.01)
*H04L 29/06* (2006.01)
(Continued)

(52) U.S. Cl.
CPC .............. *H04L 63/20* (2013.01); *G06F 21/62* (2013.01); *H04L 63/061* (2013.01);
(Continued)

(58) Field of Classification Search
CPC .......... G05B 2219/32136; G06F 21/62; H04L 63/061; H04L 63/0823; H04L 63/10; H04L 63/126; H04L 63/20; H04W 4/005
See application file for complete search history.

(56) References Cited

U.S. PATENT DOCUMENTS 7,356,705 B2 * 4/2008 Ting .................. G06F 21/32
713/176
2007/0143629 A1 6/2007 Hardjono et al.
(Continued)

FOREIGN PATENT DOCUMENTS

CN  102891750 A  1/2013

OTHER PUBLICATIONS

Rehbock, Sascha, and Ray Hunt. "Trustworthy clients: Extending TNC to web-based environments." Computer Communications 32.5 (2009): 1006-1013. (Year: 2009).*
(Continued)

*Primary Examiner* — Michael Simitoski
(74) *Attorney, Agent, or Firm* — Lempia Summerfield Katz LLC

(57) ABSTRACT

Adapting access rules for a data interchange between a first network and a second network by the second network is provided based on a service-specific integrity information item of the first network, wherein the first network processes data for carrying out a service and the service defines multiple components. A respective integrity status is transmitted for each of the components by each respective component via a communication link within the first network to a management unit of the first network. The service-specific integrity information item is computed based on each respective integrity status by the management unit. The service-specific integrity information item is transmitted by a network access point of the first network to a receiver in the second network for adapting the access rules.

(Continued)

Access by the receiver to each respective integrity status is prevented.

17 Claims, 2 Drawing Sheets

(51) Int. Cl.
    *H04W 4/70*     (2018.01)
    *H04W 4/00*     (2018.01)
    *G06F 21/62*     (2013.01)
    *G06F 21/50*     (2013.01)

(52) U.S. Cl.
    CPC .......... *H04L 63/0823* (2013.01); *H04L 63/10* (2013.01); *H04W 4/005* (2013.01); *H04W 4/70* (2018.02); *G05B 2219/32136* (2013.01); *H04L 63/126* (2013.01)

(56) References Cited

U.S. PATENT DOCUMENTS

| | | |
|---|---|---|
| 2008/0083039 A1 | 4/2008 | Choi et al. |
| 2010/0077213 A1 | 3/2010 | Xiao et al. |
| 2011/0010533 A1* | 1/2011 | Buford .................... G06F 9/468 713/150 |
| 2011/0179477 A1 | 7/2011 | Starnes et al. |
| 2013/0031360 A1 | 1/2013 | Dewitz et al. |
| 2014/0122873 A1* | 5/2014 | Deutsch .................. H04L 63/20 713/158 |
| 2014/0283031 A1* | 9/2014 | Eksten .................... G06F 21/51 726/22 |
| 2017/0372062 A1* | 12/2017 | Eksten .................... G06F 21/51 |

OTHER PUBLICATIONS

German Office Action for related German Application No. 10 2013 219 375.0, dated Jul. 4, 2014, with English Translation.

PCT International Search Report and Written Opinion of the International Searching Authority dated Oct. 27, 2014 for corresponding PCT/EP2014/066814, with English Translation.

Chinese Office Action for Chinese Patent Application No. 201480053068.4, dated Jan. 29, 2018.

* cited by examiner

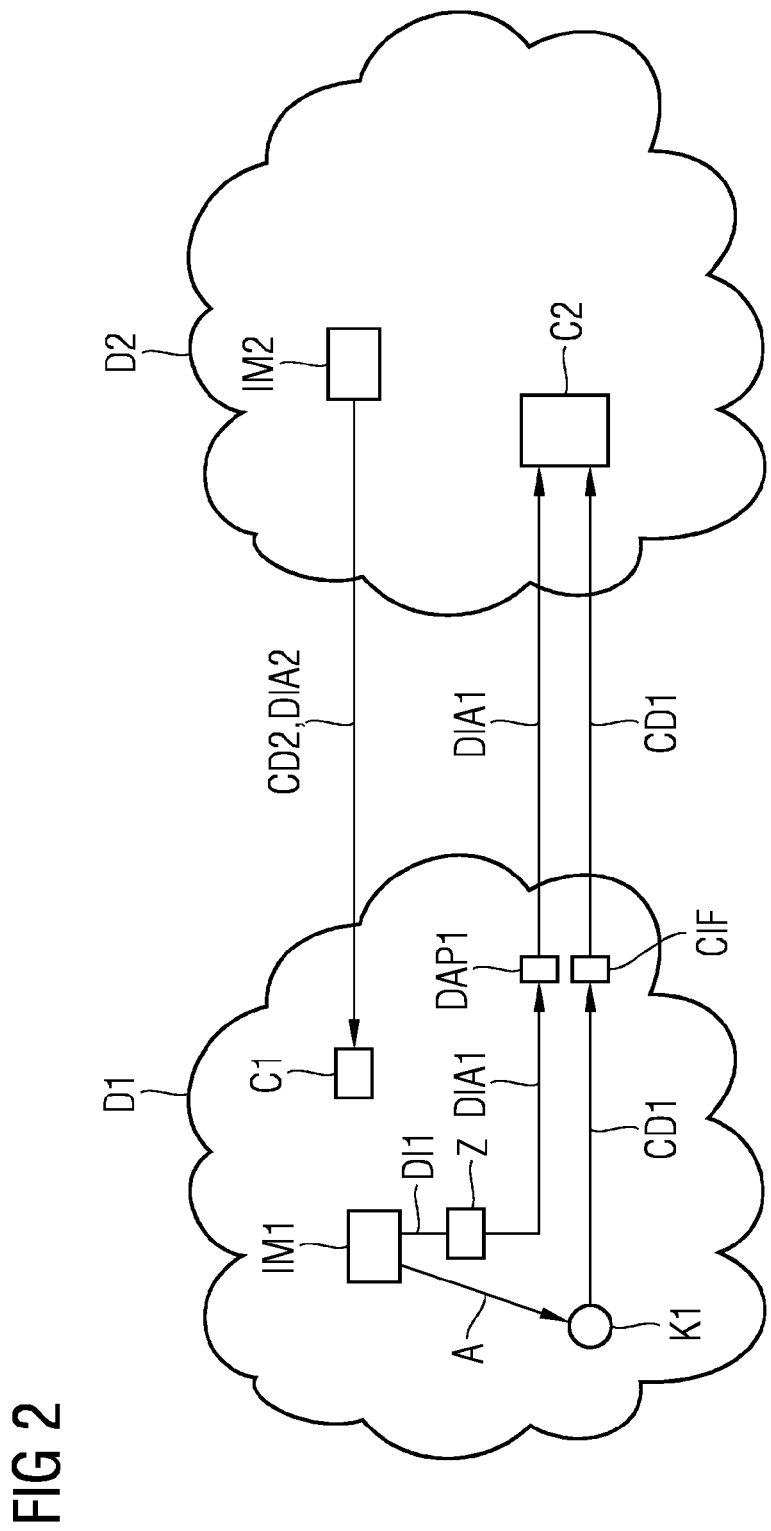

ADAPTATION OF ACCESS RULES FOR A DATA INTERCHANGE BETWEEN A FIRST NETWORK AND A SECOND NETWORK

CROSS-REFERENCE TO RELATED APPLICATION

This application is the National Stage of International Application No. PCT/EP2014/066814, filed on Aug. 5, 2014, which claims priority to DE102013219375.0, filed Sep. 26, 2013, both of which are hereby incorporated by reference in its entirety.

FIELD

The present embodiments relate to a method for adapting access rules for a data interchange between a first network and a second network via the second network on the basis of a service-specific integrity information item of the first network, and to a system for providing a service-specific integrity information item on the first network.

BACKGROUND

The provision of services often requires the cooperation of different service providers. A term used in this context is "service oriented architecture." By way of example, the widespread use of cloud services requires an end customer to cooperate with a cloud service provider. Between the two partners, contractual relationships exist that describe the service. In addition, the cloud service provider can in turn outsource some of the provided service to other service providers. Contractual safeguards between the service providers are also necessary in this case. An example from the realm of automation is a smart metering method using a smart meter device (e.g., an electricity meter) associated with a meter data operator. The meter data operator is connected to an energy supplier in order to make the consumption data available for billing.

For such service provision, the integrity of devices that are involved plays a crucial part, since intentional or unintentional alterations or manipulation can adversely affect the quality of the service or disrupt the service provision.

The prior art discloses network access checks, checking information about a present configuration of a system before network access is enabled. In this case, terminals are checked for guideline conformity with guidelines for a network during authentication.

The conventional art further provides a device attestation that assures third parties of system properties of a component via a trusted platform module, TPM for short. In this case, a hardware security integrated circuit produces a cryptographically protected configuration information item about the executed software of a component.

The conventional approaches involve the integrity of a single device being protected or an integrity information item of a single device being confirmed. In a case of a service oriented architecture, integrity information of a single device is not semantically significant, however. A service, such as the provision of a particular service interface, can be provided on multiple different devices. A service can even call other services, that may, in turn, be provided on different hardware devices.

SUMMARY AND DESCRIPTION

A service provider wants to protect internal matters concerning its computer center from disclosure to customers or business partners. An information item concerning individual devices or components of a service provider therefore needs to be avoided.

The present embodiments are therefore based on the object of providing a method and a system that can provide a protected integrity statement about a service of a first network.

A method is provided for adapting access rules for a data interchange between a first network and a second network by the second network on the basis of a service-specific integrity information item of the first network. The first network processes data, for carrying out a service, and the service defines one or more components. The method includes transmission of a respective integrity status for the number of components by the respective component via a communication link within the first network to a management unit of the first network. The method also includes computation of the service-specific integrity information item on the basis of the respective integrity status(es) by the management unit, and transmission of the service-specific integrity information item by a network access point of the first network to a receiver in the second network for adapting the access rules. Access by the receiver to the respective integrity status(es) is prevented.

By way of example, the first network and/or the second network is/are understood to mean a respective domain that may be administrated separately and independently of the other domain in each case. By way of example, a domain includes a computer center and components such as servers or hardware components. It is also possible to refer to a network domain or a respective administrative separate network zone.

The first network carries out a service. The service may be particularly an editing step for data that is outsourced by the second network. The second network wishes to have the service handled by an external network or an external domain, for example on account of a lack of resources. The first network is then a service provider, for example, in the context of a cross domain service.

The communication link within the first network may be provided wirelessly or in wireless form.

In the present application, a management unit is understood to mean particularly a unit that has central access to a respective integrity status of a respective component of the first network. Such a management unit is also called an inventory management system. The central inventory management is used to record the integrity state of individual systems within the first network or the first domain. The management unit additionally has information about the association of the components with services.

To ascertain a respective integrity status, the management unit can additionally stipulate criteria for a check for each component. The management unit may request information from a component or a device regarding the software version number, regarding installed virus patterns, or regarding similar security-relevant parameters. Facilities that are present on a component, e.g., a terminal, in order to provide system properties in a protected manner, e.g., a trusted platform module, can be used in the management unit in order to outsource the check on the integrity of an individual device to another device. The management unit requests particularly the respective integrity status on the components that the management unit identifies as belonging to the service.

Access to the integrity status of a component of the first network is not possible from the receiver in a second network. In this case, there is particularly no possibility of provision of a communication link from outside the first network directly to a component. In addition, internal information, such as about the integrity of individual devices, cannot be forwarded directly to external communication partners outside the first network.

Hence, a service provider does not have to disclose internal information from its own system. In addition, it is advantageous for the second network that wishes to use the service of the first network to be provided with a service-specific integrity information item in the first network. In particular, the complete information regarding devices or servers within the first network that are needed for carrying out the service is not available on the second network. In this case, a service can be provided on multiple different devices and/or call other services that are provided on different hardware devices or access different servers.

If the receiver in the second network receives the service-specific integrity information item and if adoption of data from the first network is not permitted on account of an integrity information item that classifies the first network as not trustworthy, then filter rules in the second network are adapted or tightened. By way of example, the communication of two different IP address ranges can be controlled in each case via a gateway that additionally has a function of a firewall. The relevant measures as a reaction of the integrity information item are then implemented by a configuration setting of the firewall. To this end, there is an association between received integrity information items and filter codes of the firewall.

According to one advantageous embodiment, the service-specific integrity information item provides a service identifier, a domain identifier, an integrity checking code, and/or a time stamp.

An explicit association is ensured between the service-specific integrity information item and the service or the domain that carries out the service. An integrity checking code can additionally specify in what way or on the basis of what policy or code the service-specific integrity information item has been ascertained. It is possible to specify the criteria that underlie the check on the component for ascertaining the respective integrity status. A time stamp can additionally ensure that the service-specific integrity information item is up to date.

According to one advantageous embodiment, the service-specific integrity information item provides a list or a link to a list of the number of the components.

When the link to a device list is specified, the list can be made available centrally. The list may be set up in a similar manner to a certificate blacklist or a white list or positive list. Besides the component names, the list may also include the respective integrity status or a valuation-less direct or unprocessed result of a check on the respective component. The service-specific integrity information item can be transmitted via the network access point (e.g., for the purposes of TLS) as an encryption protocol. The list of the components can be provided via a further access point (e.g., via a web server whose associated link is included in the service-specific integrity information item).

According to one embodiment, the integrity information item is represented by a value including a set of at least two values.

By way of example, two classes may be provided, or two categories, the first category representing an intact or integral or nonsuspect state of the first network or of the components of the first network that are required for the service. A second category then represents an untrustworthy state. A binary representation with 0 or 1 can then be used to provide the relevant category as a service-specific integrity information item.

In addition, more fine-grained categories may be provided that provide the receiver with more detailed information about the state of individual components. Hence, it is advantageously possible for the second network to adapt access rules. Hence, different measures can be initiated on the basis of the service-specific integrity information item. It is thus possible to deny use of the service completely if a negative integrity information item is transmitted to the second network. When a detailed analysis is provided, the second network may have a service performed in part by the first network. In this case, only noncritical data may be transmitted to the first network. In addition, the first network may make available to the second network only data that are used for non-security-critical applications within the second network.

According to one embodiment, the second network is administrated by a second management unit that is different than the first network.

It is therefore possible for the two networks to be comparable systems. In particular, the system integrity of both networks as domains of two service providers can be ensured via the disclosed method being performed from the point of view of both domains. This can include not only the integrity of the devices of the domain but also other characteristic system or service properties, such as a present utilization level of servers or an available network bandwidth, for example.

According to one embodiment, the number of components is produced in the form of computation units including a processor for carrying out the service within the first network.

The first network can provide a multiplicity of services. Multiple computation units or subsystems within the first network can advantageously be used for quickly carrying out the service.

According to one embodiment, the data transmission between the number of components and a subscriber outside the first network is carried out via a network access point, wherein the network access point limits the data transmission.

Hence, the components for a subscriber outside the first network are not directly addressable. The communication between the first network and the second network is therefore routed via the network access point or domain access point or service access point. The data transmission is thus ensured for the purposes of carrying out the service if the integrity of the service is confirmed. At the same time, the individual integrity statuses of the components are protected against access from outside the network.

According to one advantageous development, the service-specific integrity information item is transmitted as part of an authentication certificate.

In the course of the authentication of the first network to the second network, the service-specific integrity information item may also be transmitted. By way of example, the authentication certificate having an identifier for the domain and a public key assumed by a certification entity is transmitted together with the integrity information item. To ensure the confidentiality, authenticity, and integrity of the data transmitted with the authentication certificate, the authentication certificate includes a digital signature whose genuineness can be checked by the receiver using the public key of the certificate user.

According to one embodiment, the service-specific integrity information item is tied to an authentication certificate via an attribute certificate.

The attribute certificate then includes the service-specific integrity information item, inter alia, and refers to the associated authentication certificate. In this case too, a trustworthy entity uses an electronic signature to confirm the tie between the integrity information item and the authentication certificate and hence a sender in the first network.

In this case, the authentication certificate is checked by the receiver using the public key of the certificate user. The decoupling of the integrity information item from the authentication certificate simplifies the provision of the integrity information item, since the authentication certificate does not need to be regenerated whenever integrity information is provided. This allows dynamic association of assurances about the requested integrity state or what are known as integrity attestations with the authentication certificates.

The trustworthy integrity or certification center for the attribute certificate may be different than that for the authentication certificate.

According to one embodiment, the first network produces an attestation for the service-specific integrity information item on the basis of cryptographic key material.

In this case, particularly the management unit of the first network can provide an attestation about the achieved security status of the first network or of the first domain or of the combination of components that are needed for the service. The cryptographic key material used may, particularly in the case of asymmetric encryption methods, be a private key of the inventory management system or a symmetric key that represents a shared secret between the first network and the second network.

According to one embodiment, the attestation is formed by a cryptographic checksum of the management unit.

The management unit (e.g., the inventory management of the first network) acts as a trustworthy, certificate-issuing component. The cryptographic checksum protects the attestation against manipulation. The cryptographic checksum may be a digital signature, such as an RSA signature, a DSA signature or an EC-DSA signature, for example, or an authentication code, such as a message authentication code, e.g. AES-CBC-MAC, HMAC-SHA256.

According to one embodiment, the attestation is evaluated by the receiver.

The second network can particularly perform a signature check using the public key of the management unit of the first network. This ensures the integrity of the integrity information item and the authenticity of the sender in the first network. In addition, evaluations can be performed regarding the up-to-dateness of the integrity information item or the attestation about the integrity information item.

According to one embodiment, the attestation is produced on the basis of a feature of the second network.

The integrity confirmation can then be generated dynamically at the request of the second network in the first network. In particular, a time of a request may also be included in the attestation, so that it is possible to ensure that the attestation is up to date or fresh. As a result, the second network also delivers a feature in the request that involves the first network in the generation.

The disclosed embodiments additionally relate to a system for providing a service-specific integrity information item of a first network, wherein the first network can process the data for carrying out a service and the service can define components for transmitting a respective integrity status of the number of components via a communication link in the first network to a management unit in the first network. The system includes a management unit for computing the service-specific integrity information item on the basis of the respective integrity status(es) and a network access point of the first network for providing the service-specific integrity information item for a receiver for adapting an authorization. Access by the receiver to the respective integrity status(es) can be prevented.

According to one embodiment, the system additionally includes an attestation unit for producing an attestation on the basis of the service-specific integrity information item via cryptographic key material.

According to one embodiment, the system additionally has a connection to an attestation unit or certification entity for performing the method acts described above.

The scope of the present invention is defined solely by the appended claims and is not affected to any degree by the statements within this summary. The present embodiments may obviate one or more of the drawbacks or limitations in the related art.

DESCRIPTION OF THE FIGURES

The disclosed embodiments are explained in more detail using exemplary embodiments with reference to the figures.

FIG. 2 depicts a schematic illustration of a system including a first network and a second network for respectively performing a method according to another exemplary embodiment.

DETAILED DESCRIPTION

Figure 1:
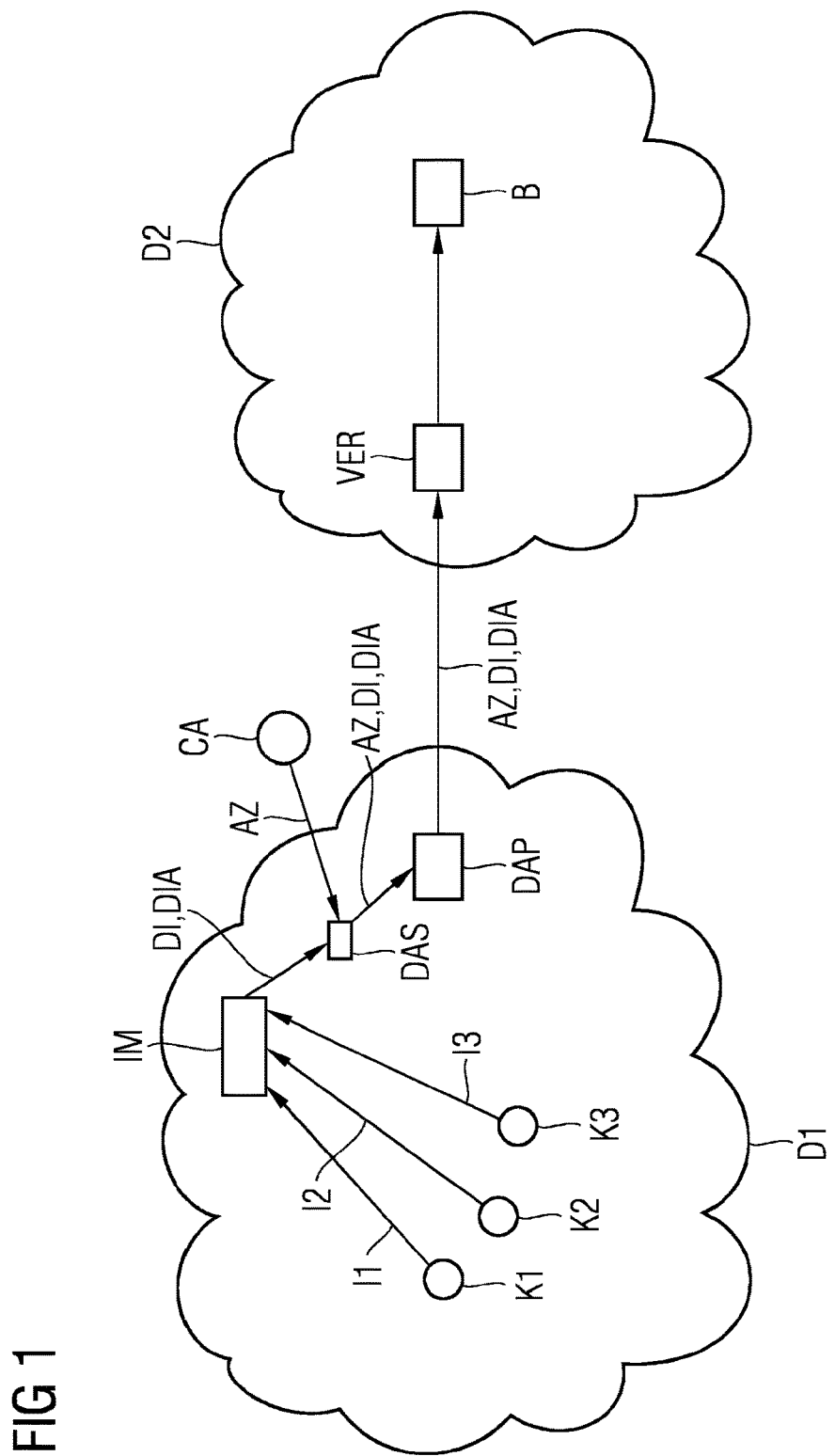
FIG. 1 depicts a schematic illustration of a system for performing a method according to an exemplary embodiment.

According to one disclosed embodiment, a process act B is intended to be performed in a second network D2 within an automation installation when there are constraints that turn out differently depending on process act B. In this case, the constraints can be formed by surroundings-specific and variable data. Information about the constraints is obtained via a service provider. The service provider is a first network D1 that contains multiple components K1, K2, K3 for carrying out the service.

Process act B is additionally intended to be carried out only when, in addition to the information, there is also an attestation DIA or assertion that confirms an integrity state DI for the components or for the combination of components that are involved in the service (e.g., when the information that is provided about the integrity of the service components is extended by an attestation DIA about the service-specific integrity information item DI). The constraints that are relevant for process act B may be historical or present data or forecast values.

If, by way of example, a material-processing act is intended to be performed only when a constant ambient temperature is guaranteed or when there is variation within a stipulated temperature range, then there must be an assured temperature forecast within the installation. To this end, the second network D2 uses a service of the first network D1 to provide temperature values and temperature diagnoses. This service is provided with the first network D1 by involving the components K1, K2, K3. In this case, a first component K1 is a first sensor installed within the installation. A second component K2 is an external sensor, and a third component K3 is a server that can request weather forecast values from an external weather station and makes said values available to the first network D1.

A management unit IM within the first network D1 is embodied as an inventory management system. The management unit IM collects information about individual integrity statuses I1, I2, I3 of the components K1, K2, K3. In addition, the management unit IM derives a service-specific integrity information item DI therefrom for each service that the first network D1 makes available. As a result, the management unit IM ascertains a security status for the first network D1. Advantageously, the checks on the components K1, K2, K3 are initiated at regular intervals via of the management unit IM regularly requesting the integrity status I1, I2, I3 of the components K1, K2, K3. Thus, an up-to-date security status is always available for the various services, which particularly access different servers and may therefore have a different status than one another.

When the second network D2 requests the service for providing the temperature forecast, a network access point DAP, also called domain access point, of the first network D1 makes a request for a service-specific integrity information item DI to the management unit. The network access point DAP requests a statement about the state with regard to the integrity of those components that are used for carrying out the service. The management unit IM can take a requested statement as a basis for ascertaining the up-to-date respective integrity status I1, I2, I3 of the respective component K1, K2, K3.

The management unit IM issues the network access point DAP with an attestation DIA about the service-specific integrity state DI or what is known as a domain integrity assertion.

The check on servers that the service accesses or devices from subnetworks that have access to the first network D1 may occur only in some cases, or vice versa, can be initiated regularly by using a network access control method, for example. Thus, the management unit IM has up-to-date statements available about the integrity state of the servers at all times. Besides an indication of the integrity status I3 of a server that is needed for the service, it is also additionally possible to involve the integrity of a management system of the server in order to ensure a higher quality of service.

The management unit IM ascertains the service-specific integrity information item DI in the function of a domain integrity compliance management. The domain integrity assertion is a service-specific integrity information item DI digitally signed by the inventory management and is made available to a domain access server DAS. The latter can use the domain integrity assertion directly or forward the domain integrity assertion at the request of third parties. If the assertion is used directly, the assertion can be transmitted as part of the authentication certificate AZ of the domain access server DAS in the authentication process between the first network D1 and the second network D2. The authentication certificate AZ is issued by a certification entity CA.

The assertion can also be transmitted as part of a security protocol, such as Internet protocol security (IPSec), or transport layer security (TLS), for example.

In the second network D2, the assertion is validated by a receiver VER using a signature check, an up-to-dateness check, or an association with the domain, identified via the IP address space or a domain name system name range.

In addition, the domain access point can make available a list of components K1, K2, K3 belonging to the service and the respective integrity statuses I1, I2, I3 of said components. Besides the rating result of the inventory management system that may be a pure yes/no statement with regard to the integrity, a more detailed list is additionally transmitted. Transparency for a user of the service is increased and can particularly provide information if an integrity attestation that is not completely positive is provided.

The attestation DIA provided can be taken as a basis for enabling a service via terms of logic AND functions for authorizations. When an attestation DIA with maximum positivity is provided, complete integrity of all components involved is then assumed and access is enabled that combines all the possible authorizations using a logic AND function.

If the transmitted integrity information item DI or attestation DIA means that a worse security status for the service-provided domain is assumed, then the authorizations are restricted. That is, only some steps of the service are used, for example.

If, in the example described, an attestation DIA may issue confirming complete integrity of the internal and external sensors but not classifying the integrity status of the server for ascertaining the temperature forecast data as trustworthy. Then the second network D2 (e.g., a control system of the automation installation) can accept data provided by the service only in part. The installation can then be controlled using the temperature data from the sensors, whereas the temperature forecast data are ascertained by resorting to a service from another service provider.

In addition, a system according to another exemplary embodiment provides secure service provision when cross domain services are used. Cross domain information exchange is the basis for many industrial smart scenarios (e.g., smart grid, smart city or smart factory). Specific operating data is provided from one domain for another domain, and the domains involved are under different administrative control. The interchanged data are used for monitoring and control by a control system of one of the domains, for example.

In such a setting, particularly the reciprocal verification of an adequate integrity status is advantageous.

In a second exemplary embodiment, the first network D1 is equipped with a first management unit IM1 or first inventory management system. The second network D2 is equipped with a second management unit IM2 or a second inventory management system. The method described above or an embodiment thereof is performed both from the point of view of the second network D2 with the first network D1 as service provider and from the point of view of the first network D1 with the second network D2 as service provider.

It is thus possible for respective received control commands CD1, CD2 to be accepted by respective control components C1, C2 of the respective domain based on a respective transmitted attestation DIA1, DIA2 about the security status of the domain sending the control commands.

The first management unit IM1 particularly issues a first service-specific integrity information item DI1 and forwards the item DI1 to an attestation unit Z. Attestation unit Z produces a signature for the first service-specific integrity information item DI1 and makes the signed integrity information item available to a first network access point DAP1 as a first attestation DIA1. The first network access point DAP1 provides the second network D2 with the first attestation DIA1 and uses a first data communication interface CIF1 to transmit a first control command CD1 to the second control component C2.

By way of example, a professionally operated domain can perform more extensive actions in the network of the requesting domain than a less professionally operated domain.

The performance of the service may be started in the first network D1 on the basis of the provided integrity state of the network D2. The service-providing domain, e.g., the first network D1, can ensure that the data that are provided for the second network D2 as the result of the service are not provided for a domain whose integrity state is itself poor. This may be conceivable particularly when critical data are transmitted, for example personal data or key material.

Within industrial installations, for safety-critical applications, the information from the attestation DIA about the loss of integrity on a subsystem can result in redundancy systems or alternative service providers being used. When a drop in integrity is identified, the first management unit IM1 of the service-requesting domain may send an alarm signal A to a component K1 of the first network D1.

If the service is provided by a single device, e.g., the first network is formed by the single device, then the attestation about the integrity state of the device is advantageously appended directly when the device is authenticated. One example of single device service is for the case of remote administration. The attestation can then also be requested from the remote domain, in the case of access via a local domain service point.

In addition, if a service provider, e.g. a remote service in the first network, connects to a device in the second network, then the device in the second network can ensure that the administrative access by the remote service is effected only if the integrity status of the service provider is good. If the remote service engineer connects a computer on which there is no up-to-date patch status, then the device in the second network can reject the remote service request, since the integrity status is inadequate and hence there are potential risks in the execution of the service from the point of view of the second network.

In addition, a service provider can verify compliance with a quality of service agreement or a service level agreement to a customer.

The respective components and the management unit may be implemented in hardware and/or software. When implemented in hardware, the respective unit may be in the form of an apparatus or in the form of part of an apparatus (e.g., in the form of a computer or in the form of a microprocessor). When implemented in software, the respective component and management unit may be in the form of a computer program product, in the form of a function, in the form of a routine, in the form of part of a program code, or in the form of an executable object.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for adapting access rules for a data interchange between a first network and a second network by the second network based on a service-specific integrity information item of the first network, wherein the first network processes data for carrying out a service and the service defines one or more components, the method comprising:
   transmitting a respective integrity status of each component of the one or more components, by each respective component of the one or more components, via a communication link within the first network to a management unit of the first network;
   computing, by the management unit, the service-specific integrity information item based on each respective integrity status;
   transmitting, by a network access point of the first network, the service-specific integrity information item to a receiver in the second network for adapting the access rules, wherein the first network provides an attestation for the service-specific integrity information item based on cryptographic key material;
   evaluating, by the second network, the attestation, wherein access by the receiver in the second network to each respective integrity status is prevented; and
   accepting data, by the second network, only from each component of the one or more components that has been evaluated as being trustworthy; and
   carrying out the service, by the second network, based on the accepted data from the one or more components.

2. The method of claim 1, wherein the service-specific integrity information item provides a service identifier, a domain identifier, an integrity checking code, a time stamp, or a combination thereof.

3. The method of claim 2, wherein the service-specific integrity information item provides a list or a link to a list of the plurality of components.

4. The method of claim 2, wherein the integrity information item is represented by a set of at least two values.

5. The method of claim 2, wherein the second network is administrated by a second management unit wherein the second network is different than the first network.

6. The method of claim 1, wherein the service-specific integrity information item provides a list of the one or more components or a link to the list of the one or more components.

7. The method of claim 6, wherein the integrity information item is represented by a set of at least two values.

8. The method of claim 1, wherein the integrity information item is represented by a set of at least two values.

9. The method of claim 1, wherein the second network is administrated by a second management unit, wherein the second network is different than the first network.

10. The method of claim 1, wherein the one or more components are computation units comprising at least one processor for carrying out the service within the first network.

11. The method of claim 1, wherein a data transmission between the one or more components and a subscriber outside the first network is carried out via a network access point, wherein the network access point limits the data transmission.

12. The method of claim 1, wherein the service-specific integrity information item is transmitted as part of an authentication certificate.

13. The method of claim 1, wherein the service-specific integrity information item is tied to an authentication certificate via an attribute certificate.

14. The method as claimed in claim 1, wherein the attestation is formed by a cryptographic checksum of the management unit.

15. The method of claim 1, wherein the attestation is produced based on a feature of the second network.

16. A system having a first network and a second network, wherein the system is configured to provide a service-specific integrity information item of the first network, wherein the first network is configured to process data for carrying out a service and the service is configured to define one or more components, the system comprising:
   the one or more components for transmitting a respective integrity status of the one or more components via a communication link in the first network to a management unit in the first network;
   the management unit for computing the service-specific integrity information item based on the respective integrity status;
   a network access point of the first network for providing the service-specific integrity information item for a receiver for adapting an authorization, wherein access by the receiver to the respective integrity status is configured to be prevented; and
   an attestation unit for producing an attestation based on the service-specific integrity information item via cryptographic key material,
wherein the second network of the system is configured to accept data only from each component of the one or more components that has been evaluated as being trustworthy and carry out the service based on the accepted data from the one or more components.

17. The system of claim 16, further comprising:
   a certification entity configured to:
      transmit a respective integrity status for the one or more components by each respective component of the plurality of components via a communication link within the first network to a management unit of the first network;
      compute the service-specific integrity information item based on each respective integrity status by the management unit; and
      transmit the service-specific integrity information item by a network access point of the first network to a receiver in the second network for adapting the access rules, wherein access by the receiver to each respective integrity status is prevented.

* * * * *